US008868099B2

(12) United States Patent
Espinosa de los Monteros et al.

(10) Patent No.: US 8,868,099 B2
(45) Date of Patent: *Oct. 21, 2014

(54) VEHICLE IDENTIFICATION SYSTEM

(75) Inventors: Alfonso Espinosa de los Monteros, San Diego, CA (US); Michael Joseph Contour, Del Mar, CA (US); David P. Volpi, Elverson, PA (US); Jeffery Charles Farmer, San Diego, CA (US); Philippe Bergman, San Diego, CA (US); Sapna P. Mehta, San Diego, CA (US); Nashina Asaria Bacorn, San Diego, CA (US)

(73) Assignee: Omnitracs, LLC, San Diego, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/986,829

(22) Filed: Jan. 7, 2011

(65) Prior Publication Data
US 2011/0106800 A1    May 5, 2011

Related U.S. Application Data

(63) Continuation of application No. 11/521,976, filed on Sep. 14, 2006, now Pat. No. 7,894,826.

(60) Provisional application No. 60/843,343, filed on Sep. 7, 2006.

(51) Int. Cl.
*H04W 24/00* (2009.01)
*G01M 17/00* (2006.01)
*G06F 3/048* (2013.01)
*H04L 29/08* (2006.01)
*G06Q 10/08* (2012.01)
*G07C 5/00* (2006.01)

(52) U.S. Cl.
CPC .............. *G07C 5/008* (2013.01); *H04L 67/12* (2013.01); *G06Q 10/08* (2013.01)
USPC .............. 455/456.1; 455/566; 455/575.9; 701/1; 701/29.6; 715/764

(58) Field of Classification Search
USPC .................................................. 455/408
See application file for complete search history.

(56) References Cited

U.S. PATENT DOCUMENTS

| 4,255,887 | A | 3/1981 | Murai |
| 6,073,007 | A | 6/2000 | Doyle |
| 6,212,393 | B1 | 4/2001 | Suarez et al. |
| 6,256,514 | B1 * | 7/2001 | Dent et al. ............. 455/561 |
| 6,611,755 | B1 * | 8/2003 | Coffee et al. ........... 701/213 |
| 6,650,346 | B1 * | 11/2003 | Jaeger et al. .......... 715/764 |

(Continued)

OTHER PUBLICATIONS

International Search Report—PCT/US07/077081—International Search Authority, European Patent Office, Feb. 1, 2008.

(Continued)

*Primary Examiner* — Steven S. Kelley
*Assistant Examiner* — Andy Gu
(74) *Attorney, Agent, or Firm* — Arent Fox LLP

(57) ABSTRACT

The specification and drawing figures describe and show a vehicle identification system that includes a programmable application for database management of a plurality of customer-specific vehicle descriptors. The vehicle identification system also includes a mobile computing platform in a mobile satellite communications system adapted to operatively associate the customer-specific vehicle descriptors with a vehicle.

32 Claims, 3 Drawing Sheets

(56) References Cited

U.S. PATENT DOCUMENTS

| | | |
|---|---|---|
| 6,839,614 B1 | 1/2005 | Timko et al. |
| 6,885,920 B2 | 4/2005 | Yakes et al. |
| 6,888,445 B2 | 5/2005 | Gotfried et al. |
| 6,911,906 B2 | 6/2005 | Satou |
| 7,171,381 B2 | 1/2007 | Ehrman et al. |
| 7,797,276 B1 * | 9/2010 | Yang .............................. 707/636 |
| 7,894,826 B2 | 2/2011 | De Los Monteros et al. |
| 2002/0072941 A1 * | 6/2002 | Lewandowski ................... 705/7 |
| 2006/0232405 A1 | 10/2006 | Filibeck |
| 2006/0235546 A1 * | 10/2006 | Shivji ................................ 700/1 |

OTHER PUBLICATIONS

Written Opinion—PCT/US07/077081, International Search Authority, European Patent Office, Feb. 1, 2008.

* cited by examiner

VEHICLE IDENTIFICATION SYSTEM

CLAIM OF PRIORITY UNDER 35 U.S.C. §120

The present application for patent is a Continuation application of patent application Ser. No. 11/521,976, entitled "Vehicle identification system", filed Sep. 14, 2006, assigned to the assignee hereof and hereby expressly incorporated by reference herein. Patent application Ser. No. 11/521,976 claims priority to Provisional Application No. 60/843,343, entitled "Vehicle identification system" filed Sep. 7, 2006, which is assigned to the assignee hereof.

FIELD OF TECHNOLOGY

The apparatus and method disclosed and claimed in this document pertain generally to vehicle identification. More particularly, the new and useful vehicle identification system enables systemic input of a customer-specific descriptor to identify a remote vehicle operating within a communications system. The vehicle identification system is particularly, but not exclusively, useful for associating a customer-specific vehicle descriptor other than a vehicle serial number or vehicle identification number ("VIN") with a mobile computing platform operating within a mobile satellite communications system.

BACKGROUND

A system for at least two-way communications between remote computers across a mobile satellite communications system, such as a vehicle dispatcher computer and one or more communications units in a vehicle, is increasingly in demand. Users or customers of such a system desire to track location of vehicles, avoid vehicle misappropriation, communicate with vehicle operators, monitor various problems affecting a vehicle and vehicle operators, and allocate costs of vehicle operations to specific vehicles in a fleet of vehicles. Efforts to locate, track, identify, and communicate with such vehicles has been enhanced by combining the U.S. Global Positioning System with a variety of hardware and software system components in a mobile satellite communications system.

The term "vehicle" as used in this document includes but is not limited to ground-based motorized vehicles including trucks, cars, and trains, but also includes ships, boats, airborne means of transport and the like. The term "remote" as used in this document means that one object is removed in space from another systemically interrelated but distant object or objects, or that one object has the capability of acting on, controlling, sending data to, or acquiring data from, such other systemically interrelated but distant object or objects, without coming into physical contact with one another. The term "customer" as used in this document means a purchaser or subscriber to a range of services and products provided in connection with a mobile satellite communications system.

As indicated, customer demand has risen for a new, useful and improved mobile satellite communications system having enhanced capabilities and features for communication among computers and users of a mobile satellite communications system such as Qualcomm Incorporated's OMNIVISION™ system (in this document, "mobile satellite communications system"). The vehicle identification system disclosed and claimed in this document significantly alters the structure and co-operation of structure used in predecessor systems of the mobile satellite communications system, and thereby enhances the capabilities of such a system to provide capabilities to a customer not available in predecessor systems.

For example, a customer-specific vehicle descriptor may be included system-wide across a mobile satellite communications system. This feature is useful to a customer that, until now, could only use a serial number assigned to the vehicle. In the past, when a customer subscribed to a predecessor to the mobile satellite communications system and desired information about a vehicle remote from a customer base station such as a vehicle dispatcher, the customer was required to contact the host operator of the predecessor system (in this document, the "host manager"). The host manager required the customer to provide the vehicle serial number as a predicate to responding to the customer's inquiry as one step in a host manager program to maintain security and integrity of the predecessor to the mobile satellite communications system. Rather than refer to vehicles by serial number, however, customers often prefer to associate a nickname or another customer-specific vehicle descriptor with a specific vehicle. Predecessor systems of the mobile satellite communications system did not permit systemic input and use of a vehicle nickname or other customer-specific vehicle descriptor, a feature much in demand in the industry.

A customer-specific vehicle descriptor available across the entire mobile satellite communications system also serves to assist a customer and a host manager in achieving proper business practices, including invoicing. Availability of a customer-specific vehicle descriptor enables a customer to determine costs associated with or allocable to individual vehicles, and thus with individual vehicle operators. A customer-specific vehicle descriptor available across the entire mobile satellite communications system also helps a host manager avoid invoicing mistakes or problems. For example, if a vehicle is disabled or inoperable, billing for services rendered in connection with that vehicle might continue unabated in the absence of a message from the customer explaining the circumstances. In the past there was no automated method to adjust invoicing to a customer.

For these and other reasons, a demand exists in the industry for a vehicle identification system that enables systemic input of a customer-specific vehicle descriptor to identify a remote vehicle operating within a communications system such as the mobile satellite communications system.

SUMMARY

The vehicle identification system includes a programmable application for database management of a plurality of customer-specific vehicle descriptors. The programmable application for database management of a plurality of customer-specific vehicle descriptors is included in a mobile satellite communications system adapted to operatively associate a customer-specific vehicle descriptor with a vehicle.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the vehicle identification system will become apparent to those skilled in the art when read in conjunction with the following description, drawing figures, and appended claims.

The foregoing has outlined broadly the more important features of the invention to better understand the detailed description that follows, and to better understand the contributions to the art. The vehicle identification system is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the vehicle identification system, which is measured by the claims, nor intended to limit the scope of the claims. The novel features of the vehicle identification system are best understood from the accompanying drawing, considered in connection with the accompanying description of the drawing, in which similar reference characters refer to similar parts, and in which:

Figure 1:
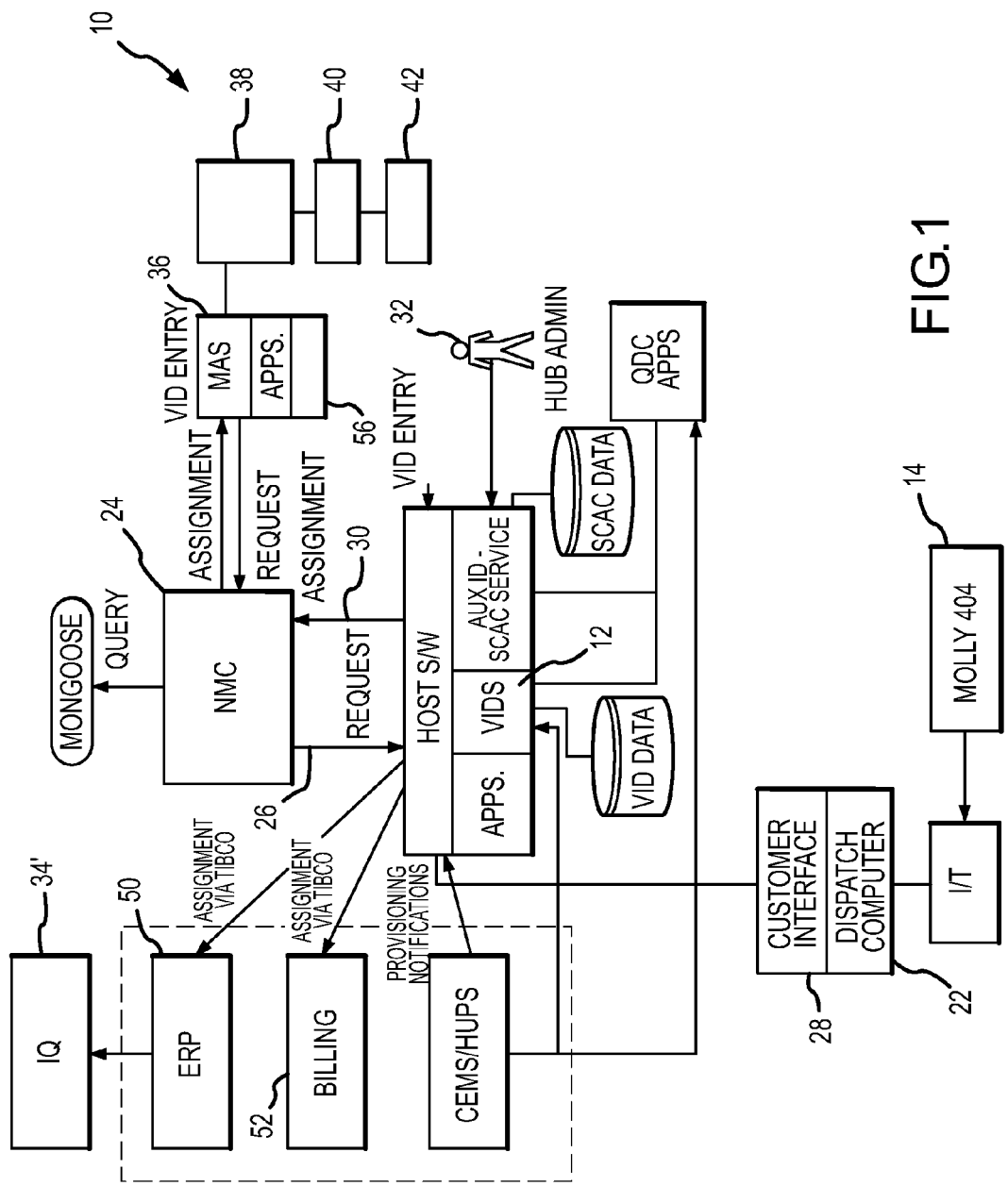
FIG. 1 of the drawing is a block diagram illustrating a the vehicle identification system.

To the extent that the numerical designations in the drawing figures include lower case letters such as "a,b" such designations include multiple references, and the letter "n" in lower case such as "a-n" is intended to express a repetitions of the element designated by that numerical reference and subscripts.

DETAILED DESCRIPTION

Figure 2:
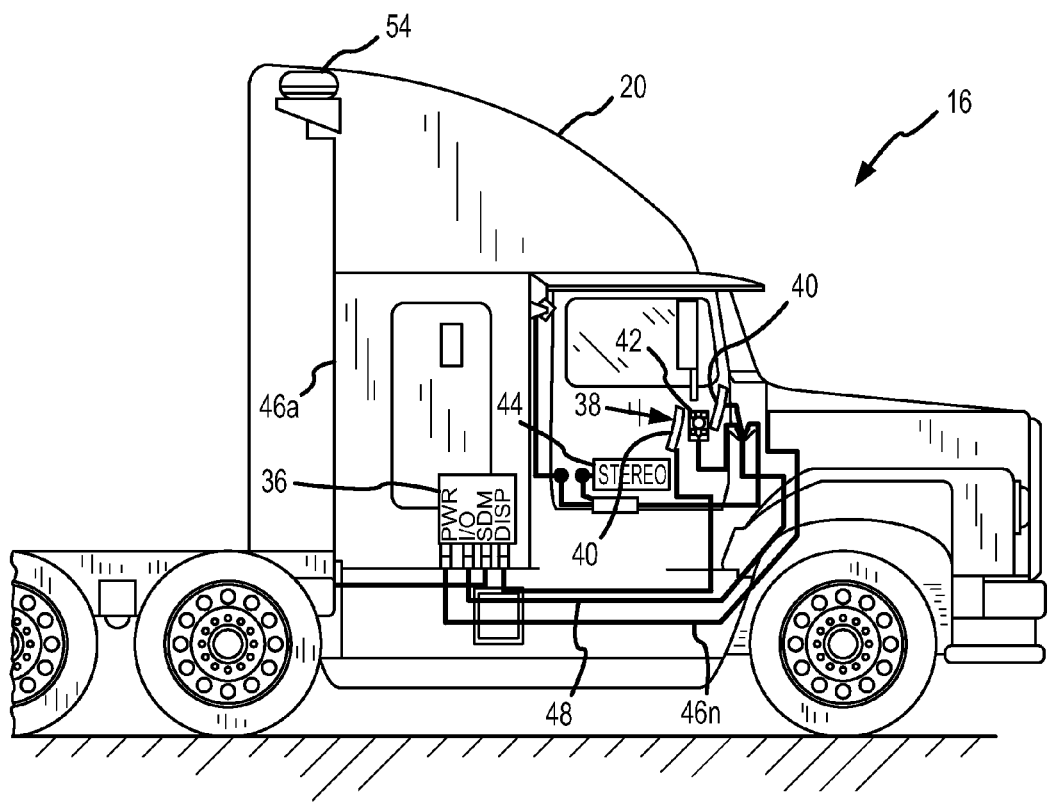
FIG. 2 is a side perspective view of a vehicle illustrating selected components of the mobile computing platform and the mobile satellite communications system.
Figure 3:
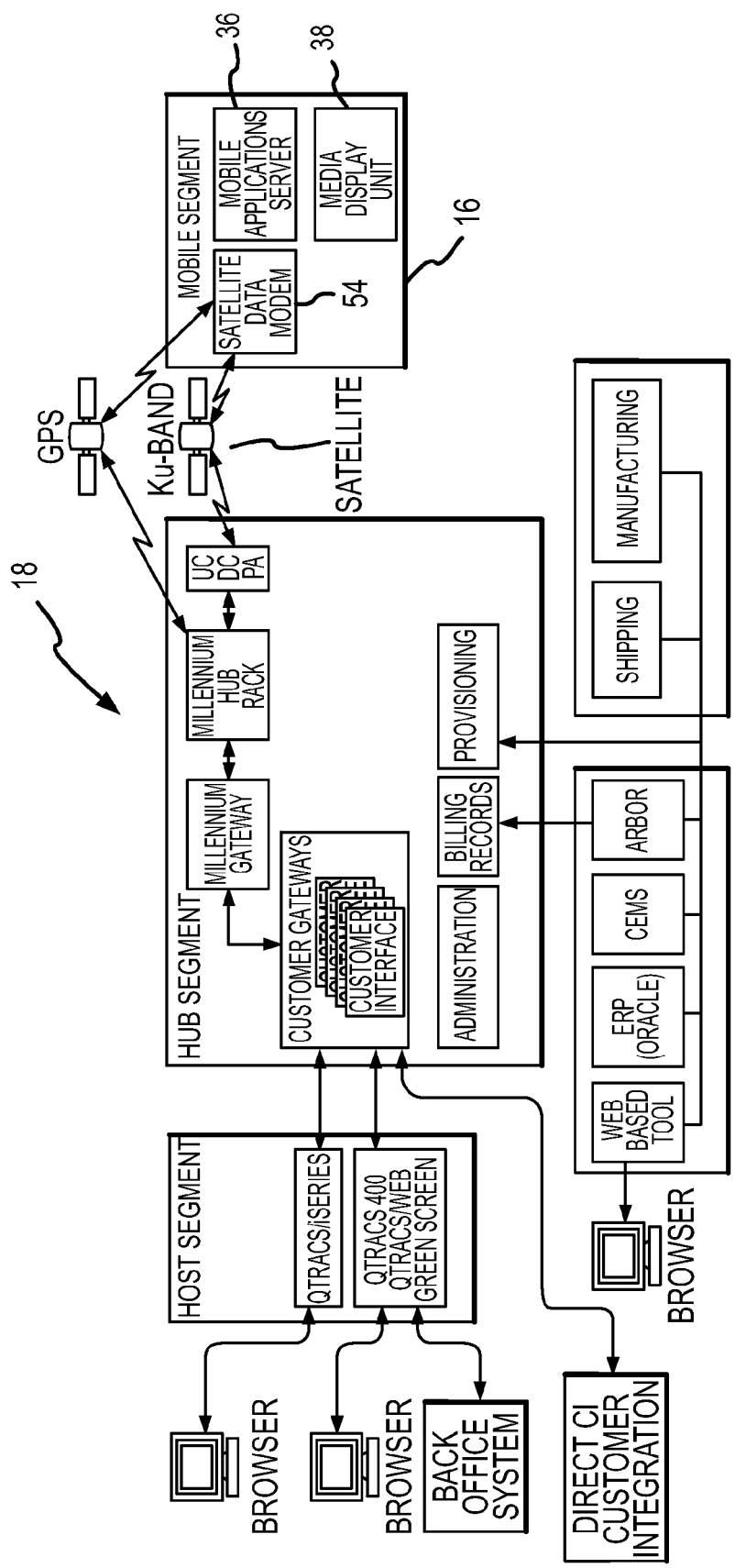
FIG. 3 is a block diagram illustrating the mobile satellite communications system.

As shown in FIGS. 1-3, a vehicle identification system is provided that in its broadest context includes a programmable application for database management of a plurality of customer-specific vehicle descriptors across a mobile computing platform in a mobile satellite communications system adapted to operatively associate a customer-specific vehicle descriptor with a vehicle.

More specifically, a vehicle identification system 10 is provided that in its broadest context includes a programmable application 12 for database management of a plurality of customer-specific vehicle descriptors 14, in addition to conventional vehicle serial numbers and other vehicle identifiers, across a mobile computing platform 16 in a mobile satellite communications system 18 adapted to operatively associate the customer-specific vehicle descriptors 14 with a vehicle 20.

As shown in FIG. 1, the mobile satellite communications system 18 includes at least a customer dispatcher computer 22 adapted to communicate with a vehicle 20 across the mobile satellite communications system 18. The mobile satellite communications system 18 also includes a network management computer 24 operatively connected to the customer dispatcher computer 22. The network management computer 24 is provided to process a variety of input and output data across the mobile satellite communications system 18, including requests 26 for assignment of a customer-specific vehicle descriptor 14 from a customer 28, as shown diagrammatically in FIG. 1, and automated assignment 30 of the customer-specific vehicle descriptor 14 to the particular vehicle 20, as also shown diagrammatically in FIG. 1. Assignment 30 of a customer-specific vehicle descriptor is shown being accomplished by a hub administrator 32 associated with a host manager (not shown). Following assignment 30 of the customer-specific vehicle descriptor 14 to the particular vehicle 20, the customer-specific vehicle descriptor 14 is available system-wide across the mobile satellite communications system 18 to any authorized user of the mobile satellite communications system 18.

As also shown diagrammatically in FIG. 1, an Internet or dial-up connector 34 is included in the computer dispatch computer 22 associated with customer dispatcher 28 and the network management computer 24 to enable the customer to initiate communication between the customer 28 dispatcher and the network management computer 24 either via a satellite as shown in FIG. 3, or terrestrial communication systems (not shown).

Mobile satellite communications system 18 includes a mobile computing platform 16 adapted for mountable operation in the vehicle 20, as shown by cross-reference between FIGS. 1-2. As shown, the mobile computing platform 16 includes a mobile application server 36. The mobile application server 36 enables communication with at least the customer dispatcher 28 across the mobile satellite communications system 18.

The mobile computing platform 16 also includes a media display unit 38, an optional compact display unit 40, a remote control unit 42, and at least one speaker 44, and a satellite data modem 54. The media display unit 38, the optional compact display unit 40, the remote control unit 42, and the at least one speaker 44 collectively enable a vehicle operator and/or a vehicle occupant to communicate at least with a customer dispatch computer 22 across the mobile satellite communications system 18. Following assignment 30 of the customer-specific vehicle descriptor, the customer-specific vehicle descriptor 14 is available system-wide for vehicle identification of any customer vehicle 20.

As shown perhaps best in FIG. 2, the mobile application server 36 that is part of the mobile computing platform 16 is removably mountable in the vehicle 20. The mobile application server 36 typically is mounted on a long-haul truck within the on-board toolbox behind the vehicle operator's cab, as shown in FIG. 2. The mobile application server 36 is connected by one or more cables 46a-n, including an accessory cable 48, to the media display unit 38, the optional compact display unit 40, and at least one speaker 44 (collectively, "components").

In addition, as also shown in FIG. 1, the mobile computing platform 16 includes a power cable disconnect detect circuit 56. The power cable disconnect detect circuit 56 mounted on a circuit board (not shown) in the mobile application server 36 as shown diagrammatically in FIG. 1. The power cable disconnect detect circuit 56 is provided to detect disconnection of a power cable 46n as by cross-reference to FIG. 2. On reconnection of power cable 46n to mobile application server 36, the mobile application server 36 senses the reconnection. In response to sensing the reconnection of power cable 46n, the mobile application server 36 prompts the mobile satellite communications system 18 that an equipment installer, vehicle driver, or customer either should enter a new customer-specific vehicle descriptor 14, or enter data indicating no change in the customer-specific vehicle descriptor 14.

In operation, vehicle identification system 10 detects connection or reconnection of power cable 46n to the mobile application server 36. Typically, this happens on an initial installation of one or more components of the mobile computing platform 16 in a vehicle 20, or on replacement of one or more components of the mobile computing platform 16, or when one or more components of the mobile computing platform 16 is moved to a different vehicle 20. In each of those examples, the programmable application for database management 12 is used to associate a customer-specific vehicle descriptor 14 with the vehicle 20. The mobile computing platform 16 also includes a protocol to send a request 26 to the network management computer 24 for entry of the customer-specific vehicle descriptor 14 in addition to a vehicle serial number and any other vehicle identifier. If the rules of the protocol are satisfied, the network management computer 24 may automatically validate the request. Alternatively, the network management computer 24 may transmit the request to the customer dispatcher computer 22 for validation.

A customer-specific vehicle descriptor 14 that is available across the entire mobile satellite communications system 18 also serves to assist a customer 28 and a host manager to achieve desired business practices, including invoicing. Availability of a customer-specific vehicle descriptor 14 enables a customer 28 to determine costs associated with or allocable to individual vehicles, and thus with individual vehicle operators. A customer-specific vehicle descriptor 14 available across the entire mobile satellite communications system 18 also helps a host manager avoid invoicing problems. For example, if a vehicle 20 is disabled or inoperable, billing for services rendered in connection with that vehicle 20 under a subscription related to predecessor communications systems might continue unabated in the absence of a message from the customer explaining the circumstances. These objective are achieved by including the vehicle identification system 10 at least one customer data base 50 as shown in FIG. 1. Customer data base 50 permits the host manager to maintain a wide array of customer data. A billing database 52 may be included to process invoice and billing information across the mobile satellite communications system 18, and information from the billing database 52 can be shared by the customer and host manager.

The vehicle identification system 10 shown in drawing FIGS. 1-2 includes at least one embodiment not intended to be exclusive, but merely illustrative of the disclosed embodiment. Claim elements and steps in this document have been numbered and/or lettered solely as an aid in readability and understanding. The numbering is not intended to, and should not be considered as intending to, indicate the ordering of elements and steps in the claims.

The invention claimed is:

1. A method of including a customer-specific vehicle descriptor across a mobile communications system, comprising:
receiving a request to add a vehicle nickname specified by a customer of the mobile communications system from a mobile computing platform at the vehicle, wherein the vehicle nickname is associated specifically with a vehicle;
assigning the vehicle nickname to the vehicle in response to the request, by a programmable application for managing a plurality of customer-specific vehicle descriptors including one or more vehicle nicknames and vehicle identification numbers (VINs), the programmable application being operatively connected to a mobile computing platform via a network management computer, wherein the vehicle nickname is different from a VIN of the vehicle;
applying the vehicle nickname system wide in the mobile communications system, wherein the vehicle nickname identifies the vehicle independent of the VIN in the mobile communications system; and
detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

2. The method of claim 1, further comprising communicating with the vehicle via a customer dispatch computer across the mobile communication system.

3. The method of claim 2, further comprising processing a variety of input and output data within the mobile communications system via the network management computer, wherein the network management computer is operatively connected to the customer dispatcher computer.

4. The method of claim 3, further comprising communicating with the customer dispatcher computer across the mobile communications system via a mobile application server included in the mobile computing platform.

5. A method of including a customer-specific vehicle descriptor across a mobile communications system, comprising:
receiving a request to add a vehicle nickname specified by a customer of the mobile communications system, wherein the vehicle nickname is associated specifically with a vehicle;
assigning the vehicle nickname to the vehicle in response to the request, by a programmable application for managing a plurality of customer-specific vehicle descriptors including one or more vehicle nicknames and vehicle identification numbers (VINs), the programmable application being operatively connected to a mobile computing platform via a network management computer, wherein the vehicle nickname is different from a VIN of the vehicle;
applying the vehicle nickname system wide in the mobile communications system, wherein the vehicle nickname identifies the vehicle independent of the VIN in the mobile communications system; and
detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

6. The method of claim 5, further comprising processing a variety of input and output data within the mobile communications system.

7. In a mobile communications system, an apparatus for assigning a customer-specific vehicle descriptor to a vehicle, comprising:
means for receiving a request to add a vehicle nickname specified by a customer from a mobile computing platform at the vehicle;
means for managing a database including a plurality of customer-specific vehicle descriptors including one or more vehicle nicknames and vehicle identification numbers (VINs) and for associating the vehicle nickname specifically with the vehicle, wherein the vehicle nickname is different from a VIN (VIN) of the vehicle;
means for applying the vehicle nickname system wide in the mobile communications system, wherein the vehicle nickname identifies the vehicle independent of the VIN in the mobile communications system; and
means for detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

8. The apparatus of claim 7, wherein the means for providing the vehicle nickname communicates with the vehicle across the mobile communication system.

9. The apparatus of claim 7, further comprising means for processing a variety of input and output data within the mobile communications system.

10. In a mobile communications system, an apparatus for assigning a customer-specific vehicle descriptor to a vehicle, comprising:
  means for receiving a request to add a vehicle nickname specified by a customer;
  means for managing a database including a plurality of customer-specific vehicle descriptors including one or more vehicle nicknames and vehicle identification numbers (VINs) and for associating the vehicle nickname specifically with the vehicle, wherein the vehicle nickname is different from a VIN (VIN) of the vehicle;
  means for applying the vehicle nickname system wide in the mobile communications system, wherein the vehicle nickname identifies the vehicle independent of the VIN in the mobile communications system; and
  means for detecting reconnection between a power cable and a mobile application server, wherein upon detecting reconnection, the mobile application server prompts a user to enter a new vehicle nickname.

11. A non-transitory storage media comprising program instructions which are computer-executable to implement assigning of a customer-specific vehicle descriptor to a vehicle in a mobile communications system, and which when executed perform:
  receiving a request to add a vehicle nickname specified by a customer from a mobile computing platform at the vehicle; and
  managing a database including a plurality of customer-specific vehicle descriptors including one or more vehicle nicknames and vehicle identification numbers (VINs) and for associating the vehicle nickname specifically with the vehicle, wherein the vehicle nickname is different from a VIN of the vehicle;
  applying the vehicle nickname system wide in the mobile communications system, wherein the vehicle nickname identifies the vehicle independent of the VIN in the mobile communications system; and
  detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

12. The non-transitory storage media of claim 11, wherein the program instructions further perform communicating with the vehicle across the mobile communications system via a customer dispatcher computer.

13. A method of including a customer-specific vehicle descriptor across a mobile communications system, comprising:
  transmitting a request to add a vehicle nickname specified by a customer of the mobile communications system from a mobile computing platform at the vehicle, wherein the vehicle nickname is associated specifically with a vehicle;
  managing a plurality of customer-specific vehicle descriptors including one or more vehicle nicknames and vehicle identification numbers (VINs), the programmable application being operatively connected to a mobile computing platform via a network management computer, wherein the programmable application assigns the vehicle nickname to the vehicle in response to the request and the vehicle nickname is different from a VIN of the vehicle, wherein the mobile communications system applies the vehicle nickname system wide wherein the vehicle nickname identifies the vehicle independent of the VIN in the mobile communications system; and
  detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

14. The method of claim 13, further comprising communicating with the vehicle via a customer dispatch computer across the mobile communication system.

15. The method of claim 14, further comprising processing a variety of input and output data within the mobile communications system via a network management computer, wherein the network management computer is operatively connected to the customer dispatcher computer.

16. The method of claim 15, further comprising communicating with the customer dispatcher computer across the mobile communications system via a mobile application server included in the mobile computing platform.

17. A method of including a customer-specific vehicle descriptor across a mobile communications system, comprising:
  transmitting a request to add a vehicle nickname specified by a customer of the mobile communications system, wherein the vehicle nickname is associated specifically with a vehicle;
  coupling to a programmable application for managing a plurality of customer-specific vehicle descriptors including one or more vehicle nicknames and vehicle identification numbers (VINs), the programmable application being operatively connected to a mobile computing platform via a network management computer, wherein the programmable application assigns the vehicle nickname to the vehicle in response to the request and the vehicle nickname is different from a VIN of the vehicle, wherein the mobile communications system applies the vehicle nickname system wide wherein the vehicle nickname identifies the vehicle independent of the VIN in the mobile communications system; and
  detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

18. In a mobile communications system, an apparatus for assigning a customer-specific vehicle descriptor to a vehicle, comprising:
  means for transmitting a request to add a vehicle nickname specified by a customer from a mobile computing platform at the vehicle;
  means for managing a database including a plurality of customer-specific vehicle descriptors including one or more vehicle nicknames and vehicle identification numbers (VINs) and for associating the vehicle nickname specifically with the vehicle, wherein the vehicle nickname is different from a VIN of the vehicle, wherein the mobile communications system applies the vehicle nickname system wide, wherein the vehicle nickname identifies the vehicle independent of the VIN in the mobile communications system; and means for detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

19. The apparatus of claim 18, wherein the means for providing the vehicle nickname communicates with the vehicle across the mobile communication system.

20. The apparatus of claim 18, further comprising means for processing a variety of input and output data within the mobile communications system.

21. In a mobile communications system, an apparatus for assigning a customer-specific vehicle descriptor to a vehicle, comprising:

means for transmitting a request to add a vehicle nickname specified by a customer;

means for managing a database including a plurality of customer-specific vehicle descriptors including one or more vehicle nicknames and vehicle identification numbers (VINs) and for associating the vehicle nickname specifically with the vehicle, wherein the vehicle nickname is different from a VIN of the vehicle, wherein the mobile communications system applies the vehicle nickname system wide, wherein the vehicle nickname identifies the vehicle independent of the VIN in the mobile communications system; and means for detecting reconnection between a power cable and a mobile application server, wherein upon detecting reconnection, the mobile application server prompts a user to enter a new vehicle nickname.

22. A non-transitory storage media comprising program instructions which are computer-executable to implement assigning of a customer-specific vehicle descriptor to a vehicle in a mobile communications system, and which when executed perform:

transmitting a request to add a vehicle nickname specified by a customer from a mobile computing platform at the vehicle;

managing a database including a plurality of customer-specific vehicle descriptors including one or more vehicle nicknames and vehicle identification numbers (VINs) and for associating the vehicle nickname specifically with the vehicle, wherein the vehicle nickname is different from a VIN of the vehicle, wherein the mobile communications system applies the vehicle nickname system wide, wherein the vehicle nickname identifies the vehicle independent of the VIN in the mobile communications system; and detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

23. The non-transitory storage media of claim 22, wherein the program instructions further perform communicating with the vehicle across the mobile communications system via a customer dispatcher computer.

24. In a mobile communications system, an apparatus for assigning a customer-specific vehicle descriptor to a vehicle, comprising:

a communications component configured to receive a request to add a vehicle nickname specified by a customer of the mobile communications system from a mobile computing platform at the vehicle, wherein the vehicle nickname is associated specifically with a vehicle;

a programmable application configured to manage a plurality of customer-specific vehicle descriptors including one or more vehicle nicknames and vehicle identification numbers (VINs), the programmable application being operatively connected to a mobile computing platform via a network management computer, wherein the programmable application is configured to assign the vehicle nickname to the vehicle in response to the request, wherein the vehicle nickname is different from a VIN of the vehicle; and a detector configured to detect reconnection between a power cable and a mobile application server, wherein upon detecting reconnection, the mobile application server prompts a user to enter a new vehicle nickname, wherein the communications component is further configured to apply the vehicle nickname system wide in the mobile communications system, wherein the vehicle nickname identifies the vehicle independent of the VIN in the mobile communications system.

25. The apparatus of claim 24, wherein the communication component communicates with the vehicle across the mobile communication system.

26. In a mobile communications system, an apparatus for assigning a customer-specific vehicle descriptor to a vehicle, comprising:

a communications component configured to receive a request to add a vehicle nickname specified by a customer of the mobile communications system, wherein the vehicle nickname is associated specifically with a vehicle;

a programmable application configured to manage a plurality of customer-specific vehicle descriptors including one or more vehicle nicknames and vehicle identification numbers (VINs), the programmable application being operatively connected to a mobile computing platform via a network management computer, wherein the programmable application is configured to assign the vehicle nickname to the vehicle in response to the request, wherein the vehicle nickname is different from a VIN of the vehicle; and a detector configured to detect reconnection between a power cable and a mobile application server, wherein upon detecting reconnection, the mobile application server prompts a user to enter a new vehicle nickname, wherein the communications component is further configured to apply the vehicle nickname system wide in the mobile communications system, wherein the vehicle nickname identifies the vehicle independent of the VIN in the mobile communications system.

27. In a mobile communications system, an apparatus for assigning a customer-specific vehicle descriptor to a vehicle, comprising:

a communications component configured to:

transmit a request to add a vehicle nickname specified by a customer of the mobile communications system from a mobile computing platform at the vehicle, wherein the vehicle nickname is associated specifically with a vehicle, and couple to a programmable application for managing a plurality of customer-specific vehicle descriptors including one or more vehicle nicknames and vehicle identification numbers (VINs), the programmable application being operatively connected to a mobile computing platform via a network management computer, wherein the programmable application assigns the vehicle nickname to the vehicle in response to the request and the vehicle nickname is different from a VIN of the vehicle, wherein the mobile communications system applies the vehicle nickname system wide, wherein the vehicle nickname identifies the vehicle independent of the VIN in the mobile communications system; and a detector configured to detect reconnection between a power cable and a mobile application server, wherein upon detecting reconnection, the mobile application server prompts a user to enter a new vehicle nickname.

28. The apparatus of claim 27, wherein the communication component is configured to communicate with the vehicle across the mobile communication system.

29. In a mobile communications system, an apparatus for assigning a customer-specific vehicle descriptor to a vehicle, comprising:

a communications component configured to:

transmit a request to add a vehicle nickname specified by a customer of the mobile communications system, wherein the vehicle nickname is associated specifically with a vehicle, and manage a plurality of customer-specific vehicle descriptors including one or more vehicle nicknames and vehicle identification numbers (VINs), a programmable application being operatively connected to a mobile computing platform via a network management computer, wherein the programmable application assigns the vehicle nickname to the vehicle in response to the request and the vehicle nickname is different from a VIN of the vehicle, wherein the mobile communications system applies the vehicle nickname system wide, wherein the vehicle nickname identifies the vehicle independent of the VIN in the mobile communications system; and a detector configured to detect reconnection between a power cable and a mobile application server, wherein upon detecting reconnection, the mobile application server prompts a user to enter a new vehicle nickname.

30. A non-transitory storage media comprising program instructions which are computer-executable to implement assigning of a customer-specific vehicle descriptor to a vehicle in a mobile communications system, and which when executed perform:

receiving a request to add a vehicle nickname specified by a customer;

managing a database including a plurality of customer-specific vehicle descriptors including one or more vehicle nicknames and vehicle identification numbers (VINs) and for associating the vehicle nickname specifically with the vehicle, wherein the vehicle nickname is different from a VIN of the vehicle;

applying the vehicle nickname system wide in the mobile communications system, wherein the vehicle nickname identifies the vehicle independent of the VIN in the mobile communications system; and detecting reconnection between a power cable and a mobile application server via a power cable disconnect detect circuit of the mobile computing platform operatively connected to the mobile application server, wherein upon detecting reconnection, the mobile application server prompts a user to enter a new vehicle nickname.

31. A method of including a customer-specific vehicle descriptor across a mobile communications system, comprising:

transmitting a request to add a vehicle nickname specified by a customer of the mobile communications system, wherein the vehicle nickname is associated specifically with a vehicle;

managing a plurality of customer-specific vehicle descriptors including one or more vehicle nicknames and vehicle identification numbers (VINs), a programmable application being operatively connected to a mobile computing platform via a network management computer, wherein the programmable application assigns the vehicle nickname to the vehicle in response to the request and the vehicle nickname is different from a VIN of the vehicle, wherein the mobile communications system applies the vehicle nickname system wide wherein the vehicle nickname identifies the vehicle independent of the VIN in the mobile communications system; and detecting reconnection between a power cable and a mobile application server, wherein upon detecting reconnection, the mobile application server prompts a user to enter a new vehicle nickname.

32. A non-transitory storage media comprising program instructions which are computer-executable to implement assigning of a customer-specific vehicle descriptor to a vehicle in a mobile communications system, and which when executed perform:

transmitting a request to add a vehicle nickname specified by a customer;

managing a database including a plurality of customer-specific vehicle descriptors including one or more vehicle nicknames and vehicle identification numbers (VINs) and for associating the vehicle nickname specifically with the vehicle, wherein the vehicle nickname is different from a VIN of the vehicle, wherein the mobile communications system applies the vehicle nickname system wide, wherein the vehicle nickname identifies the vehicle independent of the VIN in the mobile communications system; and detecting reconnection between a power cable and a mobile application server, wherein upon detecting reconnection, the mobile application server prompts a user to enter a new vehicle nickname.

* * * * *